(12) United States Patent
Li et al.

(10) Patent No.: US 10,595,184 B2
(45) Date of Patent: Mar. 17, 2020

(54) D2D DISCOVERY

(71) Applicant: Telefonaktiebolaget LM Ericsson (publ), Stockholm (SE)

(72) Inventors: Yunxi Li, Järfälla (SE); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/524,854

(22) PCT Filed: Nov. 19, 2015

(86) PCT No.: PCT/SE2015/051245
§ 371 (c)(1),
(2) Date: May 5, 2017

(87) PCT Pub. No.: WO2016/080900
PCT Pub. Date: May 26, 2016

(65) Prior Publication Data
US 2018/0041885 A1    Feb. 8, 2018

Related U.S. Application Data

(60) Provisional application No. 62/081,769, filed on Nov. 19, 2014.

(51) Int. Cl.
*H04B 7/00* (2006.01)
*H04W 8/00* (2009.01)
*H04W 76/14* (2018.01)
*H04W 72/04* (2009.01)
*H04W 4/70* (2018.01)

(52) U.S. Cl.
CPC ....... *H04W 8/005* (2013.01); *H04W 72/0406* (2013.01); *H04W 72/0446* (2013.01); *H04W 76/14* (2018.02); *H04W 4/70* (2018.02)

(58) Field of Classification Search
CPC ............. H04W 4/005; H04W 72/0406; H04W 72/0446; H04W 76/023; H04W 8/005; H04W 4/70; H04W 76/14
See application file for complete search history.

(56) References Cited

U.S. PATENT DOCUMENTS

| | | | |
|---|---|---|---|
| 2016/0255615 A1* | 9/2016 | Chatterjee | H04W 76/18 370/330 |
| 2016/0278121 A1* | 9/2016 | Agiwal | H04W 8/005 |
| 2016/0366677 A1* | 12/2016 | Fujishiro | H04W 76/14 |
| 2017/0223669 A1* | 8/2017 | Ma | H04W 8/14 |

(Continued)

OTHER PUBLICATIONS

3rd Generation Partnership Project; Technical Specifiction Group Services and System Aspects; Proximity-Based Services (ProSe) Stage 2 (Release 12); 3GPP TS 23.303 v12.0.0—Feb. 2014.

(Continued)

*Primary Examiner* — Xin Jia
(74) *Attorney, Agent, or Firm* — Patent Portfolio Builders, PLLC

(57) ABSTRACT

There is disclosed a method for operating a network node (100) in a wireless communication network, the method comprising configuring at least one D2D discovery transmitting pool and/or at least one D2D discovery receiving pool. There are also disclosed related methods and devices.

15 Claims, 8 Drawing Sheets

(56) References Cited

U.S. PATENT DOCUMENTS

2017/0325190 A1* 11/2017 Lee .................... H04J 11/00
2018/0077659 A9* 3/2018 Li ..................... H04W 76/14

OTHER PUBLICATIONS

3GPP TSG RAN WG1 Meeting #78Bis; Ljubljana, Slovenia; Source: CATT; Title: Resource pool allocation for discovery (R1-143740)—Oct. 6-10, 2014.

3GPP TSG RAN WG1 Meeting #78bis; Ljubljana, Slovenia; Source: Panasonic; Title: Clarification on resource pool configuration (R1-144102)—Oct. 6-10, 2014.

3GPP TSG RAN WG2 Meeting #85bis; Valencia, Spain; Source: Samsung; Title: Signaling flows for Type 2B Resource Allocation (R2-141388)—Mar. 31-Apr. 4, 2014.

3GPP TSG-RAN WG2 #87bis; Shanghai, P.R. China; Change Request; Title: Introduction of ProSe; Source to WG: Qualcomm Incorporated, Samsung; Source to TSG: R2 (R2-144542)—Oct. 6-10, 2014.

International Search Report for International application No. PCT/SE2015/051245—dated Mar. 2, 2016.

* cited by examiner

D2D DISCOVERY

PRIORITY

This nonprovisional application is a U.S. National Stage Filing under 35 U.S.C. § 371 of International Patent Application Serial No. PCT/SE2015/051245 filed Nov. 19, 2015, and entitled "D2D Discovery" which claims priority to U.S. Provisional Patent Application No. 62/081,769 filed Nov. 19, 2014, both of which are hereby incorporated by reference in their entirety.

TECHNICAL FIELD

The present disclosure pertains to wireless communication technology, in particular to direct communication between wireless device or D2D technology.

BACKGROUND

Recent developments of the 3GPP Long Term Evolution (LTE) facilitate accessing local IP based services in the home, office, public hot spot or even outdoor environments. One of the important use cases for local IP access and local connectivity involves the direct communication between devices in the close proximity (typically less than a few 10s of meters, but sometimes up to a few hundred meters) of each other.

In the following, the term user equipment (UE), unless explicitly stated otherwise, may refer to any terminal, e.g. mobile terminal, or wireless device, which may be adapted for cellular communication/operation and for D2D communication/operation. A user equipment may be a mobile phone, smartphone, tablet, laptop, computer, sensor arrangement, smart device, etc. adapted for such communications or operations. A user equipment may provide a terminal point or end point for communication using cellular operation and/or D2D operation. Generally, a UE may be ProSe enabled (or D2D enabled), adapted for ProSe/D2D communication/operation, e.g. according to a given standard like LTE.

This direct mode or device-to-device (D2D, also called ProSe for Proximity Services, in particular in the context of LTE, or sidelink) enables a number of potential gains over the traditional cellular technique, because D2D devices are much closer to one another than cellular devices that have to communicate via one or more cellular access points (e.g., a radio network node or eNB):

Capacity gain: First, radio resources (e.g. OFDM resource blocks) between the D2D and cellular layers may be reused (reuse gain). Second, a D2D link uses a single hop between the transmitter and receiver points as opposed to the 2-hop link via a cellular AP (hop gain).

Peak rate gain: due to the proximity and potentially favorable propagation conditions high peak rates could be achieved (proximity gain);

Latency gain: When the UEs communicate over a direct link, eNB forwarding is short cut and the end-to-end latency can decrease.

SUMMARY

For D2D communication, a network node like a base station or eNB usually has less control of the communication between the UEs than in normal cellular operation. This may cause problems for the D2D communication, in particular in terms of undesirable long delays. It is an object of the present disclosure to provide approaches to ameliorate such problems in particular pertaining to a D2D discovery procedure.

There is disclosed a method for operating a network node in a wireless communication network. The method comprises configuring at least one D2D discovery transmitting pool and/or at least one D2D discovery receiving pool.

Moreover, there is disclosed a network node for a wireless communication network, the network node being adapted for configuring at least one D2D discovery transmitting pool and/or at least one D2D discovery receiving pool.

In addition, there is disclosed a method for operating a user equipment, UE, the method comprising transmitting, by the UE, of a D2D discovery request on a resource of a discovery request transmitting pool.

A user equipment, UE, for a wireless communication network is also proposed. The UE is adapted for transmitting a D2D discovery request on a resource of a D2D discovery transmission pool and/or a discovery request transmission pool.

Furthermore, a method for operating a user equipment, UE, in a wireless communication network, is discussed. The method comprises transmitting a D2D discovery response on a resource of a discovery transmitting pool and/or a discovery response TX pool.

There may be considered a user equipment, UE, for a wireless communication network, the UE being adapted for transmitting a D2D discovery response on a resource of a discovery transmitting pool and/or a discovery response TX pool.

In addition, a program product comprising code executable by control circuitry is suggested, the code causing the control circuitry to perform and/or control any of the methods described herein.

A carrier medium arrangement carrying a program product is also disclosed. The arrangement carries a program product as disclosed herein and/or code executable by control circuitry, the code causing the control circuitry to perform and/or control any of the methods disclosed herein.

Approaches herein suggest using dedicated resource pools for D2D discovery requests or responses, allowing finely grained control of resources available for signaling or messaging related to D2D discovery, and/or to reduce possible delays between discovery requests and corresponding responses.

BRIEF DESCRIPTION OF THE DRAWINGS

The drawings are provided for illustrative purposes, and are not intended to limit the approaches to the embodiments shown.

FIGS. 6a and 6b show a method for operating a network node and a network node, respectively;
FIGS. 7a and 7b show a method for operating a user equipment and a user equipment, respectively;
and
FIGS. 8a and 8b show another method for operating a user equipment and a user equipment, respectively.

DETAILED DESCRIPTION

Figure 1:
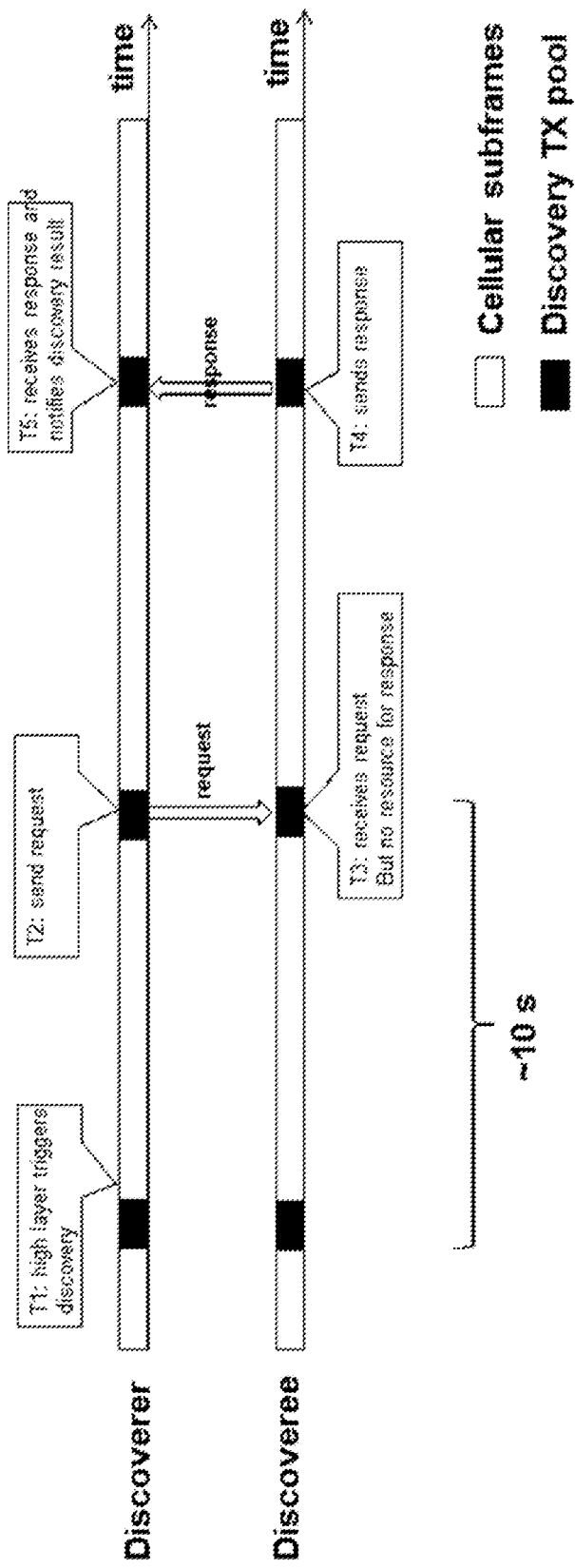
FIG. 1 shows an example of Model B Discovery.

To perform D2D or ProSe communication, wireless devices have to know that a suitable D2D or ProSe communication partner is available, by performing discovery. Models or methods for discovery comprise for example Model A and Model B discoveries.

For ProSe model B discovery, after sending out a request message, the discoverer has to receive response message from discoveree. Both discoverer and discoveree must transmit discovery messages using resources, which may be Tx resources (resources scheduled for transmitting) from a Tx pool configured by an eNodeB or network node. With a typical configuration, consecutive TX pools may be up to 10240 ms apart, so that it may take up to 20 seconds from a high layer triggering a discovery request to getting a discovery result, which leads to bad user experience.

Discovery (ProSe discovery or D2D discovery) may generally relate to a process in which one or more UEs (e.g. discoverer UE) find out/discover whether a possible ProSe communication partner is available (and/or in which form it is available) and/or in which one or more UEs (e.g. discoveree) announce or indicate that (and/or how or in which form) they are available for ProSe communication (which may enable other UEs to discover them).

Models for D2D or ProSe discovery, in particular direct discovery comprise:

Model A ("I am here"):

This model defines two roles for the ProSe-enabled UEs that are participating in ProSe Direct Discovery:

Announcing UE: The UE announces certain information that could be used by UEs in proximity that have permission to discover.

Monitoring UE: The UE that monitors certain information of interest in proximity of announcing UEs.

In this mode, the announcing UE broadcasts discovery messages at pre-defined discovery intervals and the monitoring UEs that are interested in these messages read them and process them.

Model B ("who is there?"/"are you there?"):

This model defines two roles for the ProSe-enabled UEs that are participating in ProSe Direct Discovery.

Discoverer UE: The UE transmits a (discovery) request/request message containing certain information about what it is interested to discover.

Discoveree UE: The UE that receives the request message can respond with some information related to the discoverer's request and may provide a corresponding (discoveree or discovery) response, e.g. in or with a discovery response message.

For model A discovery, the latency (up to seconds) is not necessarily critical as the transmitting UE and receiving UE will be different and/or transmitting and receiving are not necessarily causally connected, but independent (triggered independently) from each other.

For mode B discovery, latency is more important (as a UE transmits a request and receives a response).

In this disclosure, discovery refers to D2D or ProSe discovery, in particular according to Model B.

Announcing a message may comprise transmitting the message, e.g. as a directional message to a specific target and/or as broadcast or groupcast.

Two types of resource allocation for discovery message transmission are described in the following. UE autonomous resource selection: A resource allocation procedure where resources for announcing of discovery message are allocated on a non-UE specific basis. The eNB provides the UE(s) with a resource pool configuration used for announcing of discovery message. The configuration may be signalled in broadcast or dedicated signalling; The UE autonomously selects radio resource(s) from the indicated resource pool and announces discovery message. The UE can announce discovery message on a randomly selected discovery resource during each discovery period. The other resource allocation may be referred to as scheduled resource allocation: A resource allocation procedure where resources for announcing of discovery message are allocated on per UE specific basis. The UE in RRC_CONNECTED may request resource(s) for announcing of discovery message from the eNB via RRC; The eNB assigns resource(s) via RRC; The resources are allocated within the resource pool that is configured in UEs for monitoring.

For UEs in RRC_IDLE. the eNB may select one of the following options:

The eNB may provide a resource pool for UE autonomous resource selection based discovery message announcement in SIB 19. UEs that are authorized for Prose Direct Discovery use these resources for announcing discovery message in RRC_IDLE;

The eNB may indicate in SIB 19 that it supports ProSe Direct Discovery but does not provide resources for discovery message announcement. UEs need to enter RRC_CONNECTED in order to request resources for discovery message announcement. For UEs in RRC_CONNECTED:

A UE authorized to perform ProSe Direct Discovery announcement indicates to the eNB that it wants to perform ProSe Direct Discovery announcement;

The eNB validates whether the UE is authorized for ProSe Direct Discovery announcement using the UE context received from MME;

The eNB may configure the UE with resource pool for UE autonomous resource selection for discovery message announcement via dedicated signalling;

The eNB may configure resource pool along with dedicated resource in the form of time and frequency indices for discovery message announcement via dedicated RRC signalling;

Authorised receiving UEs in RRC_IDLE and RRC_CONNECTED monitor resource pools used for UE autonomous resource selection and resource pools for scheduled resource allocation. The eNB provides the resource pool configuration used for discovery message monitoring in SIB 19. The SIB 19 may contain detailed ProSe Direct discovery configuration used for announcing in neighbour cells of intra-frequency as well.

A UE may be limited to transmit discovery message within discovery pool, i.e. the discovery message can only be transmitted within a configured transmitting window that spans the discovery pool.

For discovery, a typical configuration of the discovery pool spans 64 ms every 10240 ms. With this configuration, the model B discovery latency may be up to 20 seconds, as illustrated in Figure.

For mode B discovery, both discover UE and discoveree UE have to wait for the discovery pool to transmit, which leads to long latency, as illustrated in Figure.

It should be observed that the resource to be used for transmission within a discovery pool is typically assigned or obtained by the UE before the start of the discovery pool. Therefore, transmission of the response message must wait until a new discovery pool is available.

In Figure, a typical discovery configuration is assumed: 64 ms discovery pool per 10 seconds. Discoverer UE receives discovery message from higher layer at T1, but has to wait until next discovery pool (T2) to transmit request. After it receives the request, the discoveree may not be able to transmit a response immediately (T3) due to some reason, e.g. no resource being available from the pool, as a result it has to wait for the next discovery pool (T4). At T5, the discoverer receives the response and notifies the discovery result to higher layer. In worst case, the latency between T1 and T5 will be up to 20 seconds.

Furthermore, after transmitting the discovery request, the discoverer UE has no clear idea when the response may come. As a result, the discoverer UE has to keep monitoring the discovery pool to receive the response message. Even after having received a response message, the discoverer UE has to continue monitoring the discovery pool, as there may be more response messages from other discoverees. This is not energy efficient and may limit the use a UE gets from its battery.

Generally, a (resource) pool may include and/or indicate resources for communication, e.g. cellular and/or ProSe/D2D communication. A discovery pool may indicate resources allocated for discovery. Resources in or indicated by a pool may be generally available to different UEs (which may be able to access resources of the pool) and/or be non-UE specific (in particular, when allocating resources to the pool; it may be considered that only one UE may use a given resource from a pool even if more than one UE access the pool). A network node (e.g. an eNB) may be adapted to allocate resources to one or more than one pools. The network node may comprise a pool allocating module for allocating resources to a pool. Monitoring a resource pool may refer to monitoring resources (time/frequency resources) included in or indicated by the pool, e.g. listening for transmission on the corresponding resources. A network node (e.g. eNB) and/or a pool transmitting module of the network node may be adapted to transmit pool information or pool data pertaining to the pool (e.g. indicating the resources of or in the pool), e.g. via broadcast and/or multicast and/or to a pre-defined list of UEs. The node transmitting the pool information or data may be adapted to receive, and/or receive and/or comprise a receiving module for receiving, corresponding data from another node of a network and/or a UE, which may be adapted to allocate and/or schedule resources to a resource pool and/or to define a resource pool. A resource of a pool may be a resource allocated and/or included in the pool. The resources of a resource pool may be configurable. Configurable resources may be resources that may be changed and/or re-scheduled (for example by the network node or eNB), in particular at pre-defined scheduling intervals. In other words, a configurable resource may be a resource that may be allocated and/or scheduled for different uses at scheduling intervals. A pre-defined scheduling interval may for example a subframe or a frame, in particular according to LTE.

A resource pool in general may refer to a grouping of resources configured by a network node, in particular a controlling node and/or an eNodeB. It may be considered that the functionality of a controlling node, in particular in regards to configuring one or more pools and/or indicating the one or more pools may be implemented in a UE. A resource, in particular a resource of a pool, may indicate a combination of time/s and/or frequency/ies or range/s or carrier/s. Such a combination may indicate whether an operation (in particular transmission) at the time/s and frequency/ies or range/s or carrier/s is allowed or possible for a UE or may be expected from another UE (and thus may indicate a resource for receiving). A resource does not have to be utilised, even if it is provided and/or scheduled by a network or node.

Figure 2:
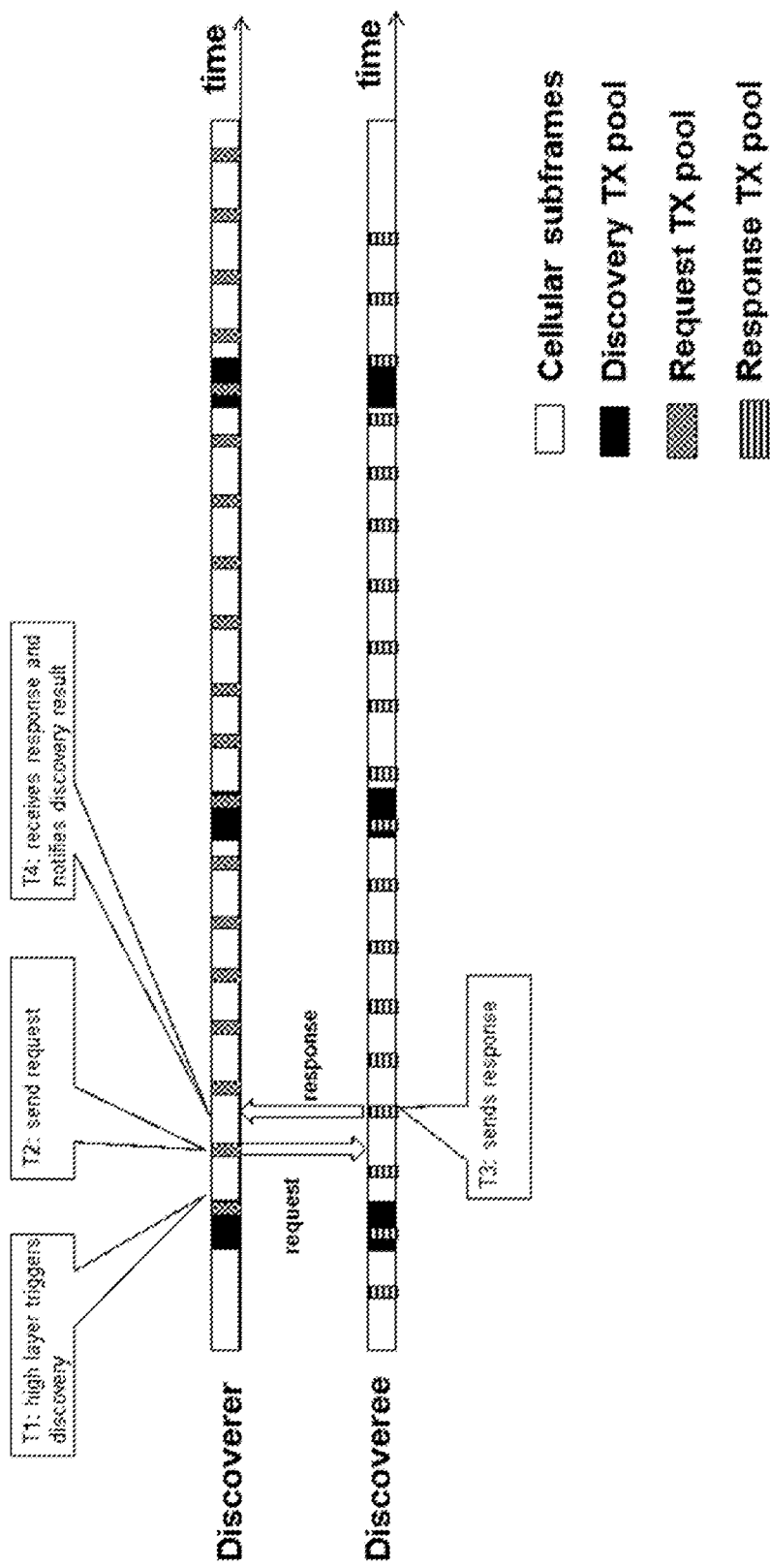
FIG. 2 shows a scenario with reduced Model B Latency.

FIG. 2 shows a scenario with reduced Model B Latency. It is disclosed to define radio resources that are dedicated to transmission and/or reception of the discovery response message (in particular for Model B). Such resources allow the response message to be transmitted shortly after the request message is received and in a controlled interference scenario. The response pool(s) may be configured by a network node like an eNB by use of dedicated or broadcast signaling, or they can be part of a UE pre-configuration. The response transmission resources may be selected by a UE (e.g. a discoveree) from within a pool of shared resources or they can be determined based on the discovery request message content or resources.

Generally, once a discovery request message is received, the discoveree may transmit the response in one of the upcoming resources available for discovery message response (which may be indicated by the dedicated TX pool for discovery response). Such resources are typically smaller than the discovery pools and they typically follow shortly (their resources follow in time) after the discovery pool.

Several variations are possible by e.g. also introducing dedicated pools for transmission of the discovery request messages. In the following different elements that may be included are described.

Configuring a resource pool may include determining and/or allocating and/or defining resources for the pool, e.g. by a controlling node.

A dedicated resource pool may comprise, or consist of, and/or indicate resources dedicated and/or allocated specifically, and/or only) for a specific purpose, e.g. transmitting or receiving or transmitting or receiving specific types of messages, e.g. discovery response messages or discovery request messages. E.g. a Tx resource pool may comprise or indicate resources for transmissions only, a Rx resource pool may comprise or indicate resources for receiving only.

A discovery request TX pool may be a pool comprising resources allocated for transmitting discovery request message. A discovery response TX pool may be a pool comprising and/or consisting of resources allocated for transmitting discovery request response messages. A discovery request RX pool may be a pool comprising and/or consisting of resources allocated for receiving, e.g. by a discoveree UE, a discovery request message and/or indicating resources in which a discovery request may be received, e.g. based on one or more pools indicating or comprising resources in which a discovery request message may be transmitted.

A discovery response TX pool may be a pool comprising and/or consisting of resources allocated for transmitting a discovery response message, e.g. by a discoveree UE. A discovery response RX pool may be a pool comprising resources allocated for receiving (e.g. by a discoverer UE) a discovery response message and/or indicating resources in which a discovery response message may be received, e.g. based on one or more pools indicating or comprising resources in which a discovery response message may be transmitted (by another UE, e.g. a discoveree).

Generally, the resources of a resource pool may be used by an UE (or more than one UE) for communication and/or may indicate resources allowable for the task or purpose a resource pool is dedicated to. A network node and/or eNodeB and/or controlling node or configuring module may be adapted to configure more than one dedicated pool, in particular such that a discovery request TX pool comprises resources which are earlier in time than a discovery response TX pool. Configuring may be performed accordingly. One or more dedicated resource pools may be configured in addition to and/or instead of a discovery pool.

A discovery response (message), which may be transmitted by a (discoveree) UE, may be a response (message) to a discovery request (message), wherein the discovery request (message) may be transmitted by a (discoverer) UE. The response (message) may be transmitted to the UE transmitting the request, e.g. a discoverer UE. Transmission and/or reception of a discovery request (message) and/or a response (message) may generally be in cellular operation or in ProSe operation.

Indicating a resource pool may comprise providing, e.g. transmitting, information pertaining to the resource pool. Information pertaining to a resource pool generally may comprise information indicating the resources comprised in the resource pool and/or the resources the resource pool consists of. The resource of a resource pool may generally be radio resources, in particular time/frequency resources. Providing and/or transmitting, information pertaining to a resource pool may comprise broadcasting and/or dedicated transmission, e.g. to one or more specific targets, which may be UEs and/or a network node, e.g. a network node which is not a controlling node, but used for transmitting the resource pool to UEs. Alternatively or additionally, such targets may be targets that have indicated and/or are adapted to indicate to a network node indicating a resource pool that the pool pertains to them, e.g. by transmitting information indicating that they are ProSe-enabled and/or are signing up for discovery, e.g. discovery of Model B, and/or are adapted with discoverer and/or discoveree capability.

A UE having discoverer capability may be adapted to transmit a discovery request (message) and/or to receive a discovery response (message), and/or may be referred to as discoverer UE. A UE having discoveree capability may be adapted to receive a discovery request (message) and/or to transmit, in response to the request (message), a discovery response (message), and/or may be referred to as discoveree UE. A UE may generally be adapted as discoverer UE and discoveree UE and/or switch between corresponding functionalities. A resource pool may be indicated according to an allocation of resources, which may be represented by a resource pool itself (e.g. an internal pool of a network node like a controlling node or eNodeB). Specific and/or dedicated pools may be indicated to specific targets. For example, a discovery request transmitting pool and/or a discovery response receiving pool may be indicated to one or more discoverer UEs. Alternatively or additionally, a discovery request receiving pool and/or a discovery response transmitting pool may be indicated to one or more discoveree UEs. In case a UE is both discoverer and discoveree, it may be target for a combination of such pools.

Obtaining information, e.g. by a UE and/or an information obtaining module, in particular information indicating a resource pool, may comprise receiving such information, e.g. from a transmission, e.g. from a network or network node, and/or reading it from a memory, e.g. a memory of control circuitry of a UE, and/or determining based on pre-determined information and/or from history; the latter of which may comprise reading from a memory as well. Obtaining information indicating a resource pool may include combining information indicating different other pools, in particular for a receiving pool.

Information indicating a discovery receiving pool may generally be obtained by obtaining and/or combining information indicating one or more than one pools including resources for and/or allowing a corresponding transmitting. For example, a discovery response RX pool and/or information indicating such may be combined from resource pools (and/or information indicating such) including resource for or allowing transmitting a discovery response (message), e.g. a discovery response TX pool and/or a discovery pool and/or related or similar pools of neighboring cells and/or provided by other network nodes. Alternatively or additionally, a discovery request RX pool and/or information indicating such may be combined from resource pools (and/or information indicating such) including resources for or allowing transmitting a discovery request (message), e.g. a discovery request TX pool and/or a discovery pool and/or related or similar pools of neighboring cells and/or provided by other network nodes.

There may be considered a method for operating a network node, which may be an eNodeB and/or controlling node. The method may comprise configuring, by the node, at least one dedicated resource pool as described herein (see e.g. the table), in particular at least one discovery transmitting (TX) pool and/or at least one discovery receiving (RX) pool. There is also disclosed a network node, which may be an eNodeB and/or a controlling node. The network node may be generally be a node of and/or for a wireless or cellular communication network. The network node may be adapted for such configuring and/or comprise a configuring module for such configuring. The method may comprise indicating the at least one resource pool. It may be considered that the network node is adapted for such indicating and/or comprises a pool indicating module for such indicating. Indicating may generally comprise indicating to specific targets, e.g. by dedicated transmission, of the resource pool, e.g. UEs adapted or having indicated the capability or intention to use resources of the pool, e.g. discoverer and/or discoveree UEs.

There may be considered a (first) method for operating a UE, which may be a discoverer UE. The method may comprise transmitting, by the UE, of a (ProSe) discovery request (message), on a resource and/or resources of a dedicated resource pool, in particular a discovery request TX pool. The method may optionally comprise monitoring resources of a second dedicated resource pool or discovery receiving pool, in particular a discovery response RX pool, for a response which may comprise a discovery response (message). Monitoring may in particular comprise monitoring only the resources of the second dedicated resource pool or discovery receiving pool for a response and/or limiting the monitoring to such resources. The method may comprise obtaining, by the UE, information indicating the dedicated resource pool and/or the second dedicated resource pool, which may be performed before transmitting; it may be considered that obtaining information indicating the second dedicated resource pool may be performed after transmitting the request (message), but before monitoring. Monitoring may generally comprise receiving a discovery response (message).

There may be considered a UE, which may be a discoverer UE. The UE may be adapted for, and/or may comprise a transmitting module for, transmitting a (ProSe) discovery request (message), on a resource and/or resources of a dedicated resource pool, in particular a discovery transmission pool and/or a discovery request TX pool. Optionally, the UE may be adapted for, and/or comprise a monitoring module, for monitoring resources of a second dedicated resource pool or a discovery receiving pool, in particular a discovery response RX pool, for a response, which may comprise a discovery response (message). Monitoring may in particular comprise monitoring only the resources of the second dedicated resource pool or discovery receiving pool for a response and/or limiting the monitoring to such resources. The UE may be adapted for, and/or comprise an information obtaining module, for obtaining information indicating the dedicated resource pool and/or the second dedicated resource pool. The UE and/or the information obtaining module may be adapted to perform obtaining before transmitting; it may be considered that obtaining information indicating the second dedicated resource pool may be performed after transmitting the request (message), but before monitoring. Monitoring may generally comprise receiving a discovery response (message).

There may be considered a (second) method for operating a UE, which may be a discoveree UE. The method may (optionally) comprise monitoring, by the UE, resources of a dedicated resource pool, in particular a discovery receiving pool and/or a discovery request RX pool, and/or (optionally) receiving a discovery request (message), in particular on a resource of the dedicated resource pool. The method may comprise transmitting, by the UE, a (ProSe) discovery response (message) on a resource and/or resources of a further dedicated resource pool, e.g. a discovery transmitting pool and/or a discovery response TX pool, e.g. in response to a discovery request (message). Monitoring may in particular comprise monitoring only the resources of the dedicated resource pool or discovery receiving pool for a request and/or limiting the monitoring to such resources. The method may comprise obtaining, by the UE, information indicating the dedicated resource pool and/or the further dedicated resource pool, which may be performed before monitoring or transmitting; it may be considered that obtaining information indicating the further dedicated resource pool may be performed after monitoring or receiving the request (message), but before transmitting. Monitoring may generally comprise receiving a discovery request (message).

There may be considered a UE, which may be a discoveree UE. The UE may (optionally) be adapted for, and/or comprise a monitoring module for, monitoring resources of a dedicated resource pool, in particular a discovery receiving pool and/or a discovery request RX pool, and/or (optionally) be adapted for, and/or comprise a receiving module for, receiving a discovery request (message), in particular on a resource of the dedicated resource pool. The UE may be adapted for, and/or comprise a transmitting module for, transmitting a (ProSe) discovery response (message) on a resource and/or resources of a further dedicated resource pool, e.g. a discovery transmitting pool and/or a discovery response TX pool, e.g. in response to a discovery request (message). Monitoring may in particular comprise monitoring only the resources of the dedicated resource pool or discovery receiving pool for a request and/or limiting the monitoring to such resources. The UE may be adapted for, and/or may comprise an information obtaining module for, obtaining information indicating the dedicated resource pool and/or the further dedicated resource pool, which may be performed before monitoring or transmitting; it may be considered that obtaining information indicating the further dedicated resource pool may be performed after monitoring or receiving the request (message), but before transmitting. Monitoring may generally comprise receiving a discovery request (message); a monitoring module may comprise a receiving module and/or these modules may be separate.

Generally, a discovery receiving pool may comprise and/or consist of resources allocated to a corresponding discovery transmission pool, so that a receiving UE may be informed when to expect a transmission. It may be considered that a discovery receiving pool includes additional resources, e.g. of a general discovery pool and/or of pools of neighboring cells of the network.

A discovery pool may generally be seen as an example of a discovery transmitting pool and/or a discovery receiving pool.

The UE may be a discoverer and/or discoveree UE and/or a UE of and/or for a wireless and/or cellular communication network.

Resources from a dedicated pool for transmitting may generally be the earliest resources of the pool available for transmitting, e.g. a request message or a response message.

A (in particular small) pool dedicated for discovery response transmission (TX) may be introduced (actually, there can be several request TX pools, e.g., associated to different discovery message types and purposes). When the discoveree transmits a response message, the discoveree may use the earliest available resources from the response pool, which may belong to a general purpose discovery TX pool or to a dedicated response TX pool.

A Response RX (reception) pool may be introduced for the discoverer to receive the response. The discoverer may monitor such a pool to detect a discovery response from other devices. In some examples, a discoverer monitors such a pool only if it has previously transmitted a discovery request.

In a further example a (e.g. small) pool dedicated for request transmission may be introduced (actually, there may be several request TX pools, e.g., associated to different discovery message types and purposes). When a discoverer UE intends to transmit a model B discovery request, it may use the earliest suitable resources, which may belong to either existing discovery TX pool or dedicated request TX pool. E.g., if the resource in existing discovery TX pool or dedicated request TX pool is available within X ms and X ms is smaller than the estimated delay of a scheduled resource from eNB, the discoverer selects resource from the pool; else the discoverer sends resource request to eNB with a model B discovery request indication.

The (first and/or second) method/s for operating a UE may comprise comparing the times for transmitting of a resource (which may be the earliest resource from the pool available) of several discovery transmitting pools (e.g. discovery pool and dedicated resource pool or further dedicated resource pool for the first and second method, respectively, in particular discovery request TX pool for the first and/or discovery response TX pool for the second method). Transmitting may be performed on the resource allowing earlier transmitting. A UE (discoverer and/or discoveree) may be adapted for, and/or comprise a comparison module, for such comparing; it may be considered that obtaining information pertains to the several discovery transmitting pools.

Additionally or alternatively, the (first and/or second) method/s for operating a UE may comprise comparing the times for transmitting of a resource (which may be the earliest resource from the pool/s available) of one or more than discovery transmitting pools (e.g. including discovery pool and dedicated resource pool or further dedicated resource pool for the first and second method, respectively, in particular discovery request TX pool for the first and/or discovery response TX pool for the second method) with an estimated time for receiving a scheduled resource from a network, e.g. a network node or eNodeB or controlling node, and/or an estimated time at which such a resource may allow for transmitting. The method/s may comprise choosing, based on the comparison, in particular choosing the choice allowing for earlier transmitting, between transmitting on a resource from the one or more pools (e.g. the resource allowing earliest transmitting), and requesting (and/or optionally subsequent receiving of) a scheduled resource from the network and transmitting on this scheduled resource. Transmitting may refer to the transmitting of the respective method.

The UE (discoverer and/or discoveree) may be adapted for, and/or comprise a comparing module for, such comparing (either/any comparing as disclosed in regards to different time allowed by resources/scheduling and/or in the context of the methods). It may be considered that obtaining information generally pertains to the one or more and/or several discovery transmitting pools, in particular those whose resources are compared regarding time allowed for transmitting.

In a further example, a request RX pool is introduced for discoveree/s to receive request. A discoveree may monitor such pool to detect discovery requests from other devices.

Generally, a (resource) pool may include and/or indicate resources for communication, e.g. cellular and/or ProSe/D2D communication. A discovery pool may indicate resources allocated for discovery. Resources in or indicate by a pool may be generally available to different UEs and/or non-UE specific (when allocating resources to the pool). A network node (e.g. an eNB) may be adapted to allocate resources to one or more than one pools. The network node may comprise a pool allocating module for allocating resources to a pool. Monitoring a resource pool may refer to monitoring resources (time/frequency resources) included in or indicated by the pool, e.g. listening for transmission on the corresponding resources. A network node (e.g. eNB) and/or a pool transmitting module of the network node may be adapted to transmit pool information or pool data pertaining to the pool (e.g. indicating the resources of or in the pool), e.g. via broadcast and/or multicast and/or to a predefined list of UEs. The node transmitting the pool information or data may be adapted to receive, and/or receive and/or comprise a receiving module for receiving, corresponding data from another node of a network and/or a UE, which may be adapted to allocate and/or schedule resources to a resource pool and/or to define a resource pool.

As shown in FIG. 2, when a discoverer UE receives a model B discovery request from higher layers at T1, there may be no resource available from the discovery TX pool for transmitting the request. The discoverer UE will use the resources from the next available Request TX pool (or general purpose discovery TX pool) and transmit a discovery request at T2. After receiving the discovery request, the discoveree UE may not be able to find resources available for transmitting a response in a general purpose discovery TX pool. Therefore, the discoveree may use resources from the next suitable response TX pool and may transmit a discovery response at T3. The overall service delay is reduced significantly compared to the implementation in Figure.

When it transmits request message, the UE or discoverer may provide, and/or be adapted to provide and/or a transmitting module may be adapted to transmit, information indicating resources on which the corresponding response is supposed to be received. Such resources may be seen as a form of a discovery response TX pool indicating; the corresponding pool may include only one or a very limited amount of resources. In this case, the discoveree may transmit a discovery response using the resources indicated in the request message, in particular if they coincide to resources of a discovery pool and/or discovery transmission pool available to the UE, e.g. a discovery response TX pool. In a further example, the resource for response TX may be indicated by the eNB or any other control node, in a UE specific or broadcast fashion and using explicit or implicit signaling.

If the discoveree UE cannot find suitable resources indicated in the request message from its existing discovery TX pool or dedicated request TX pool, it may sends a resource request to the network, e.g. a controlling node or eNB, carrying the information of resources indicated in the request message. Transmitting may be performed on the resources scheduled by the network in response to this resource request.

Generally, the UE (discoveree) may determine, and/or be adapted to determine and/or comprise a resource determining module for determining, whether the one or more discovery transmitting pools, e.g. a discovery pool and/or a discovery response TX pool, comprise resource/s for transmitting a response indicated in the discovery request (message). The UE may further transmit, and/or be adapted for transmitting and/or comprise a transmitting module for transmitting, a discovery response (message) on the resource/s indicated in the discovery request (message), if the one or more discovery transmitting pools comprise the resources for transmitting indicated, and otherwise to transmit a resource request to the network (e.g. a network node and/or eNB and/or controlling node) indicating the resources indicated in the discovery request (message) and to transmit the discovery response on a resource indicated by a response to the resource request received from the network.

Figure 3:
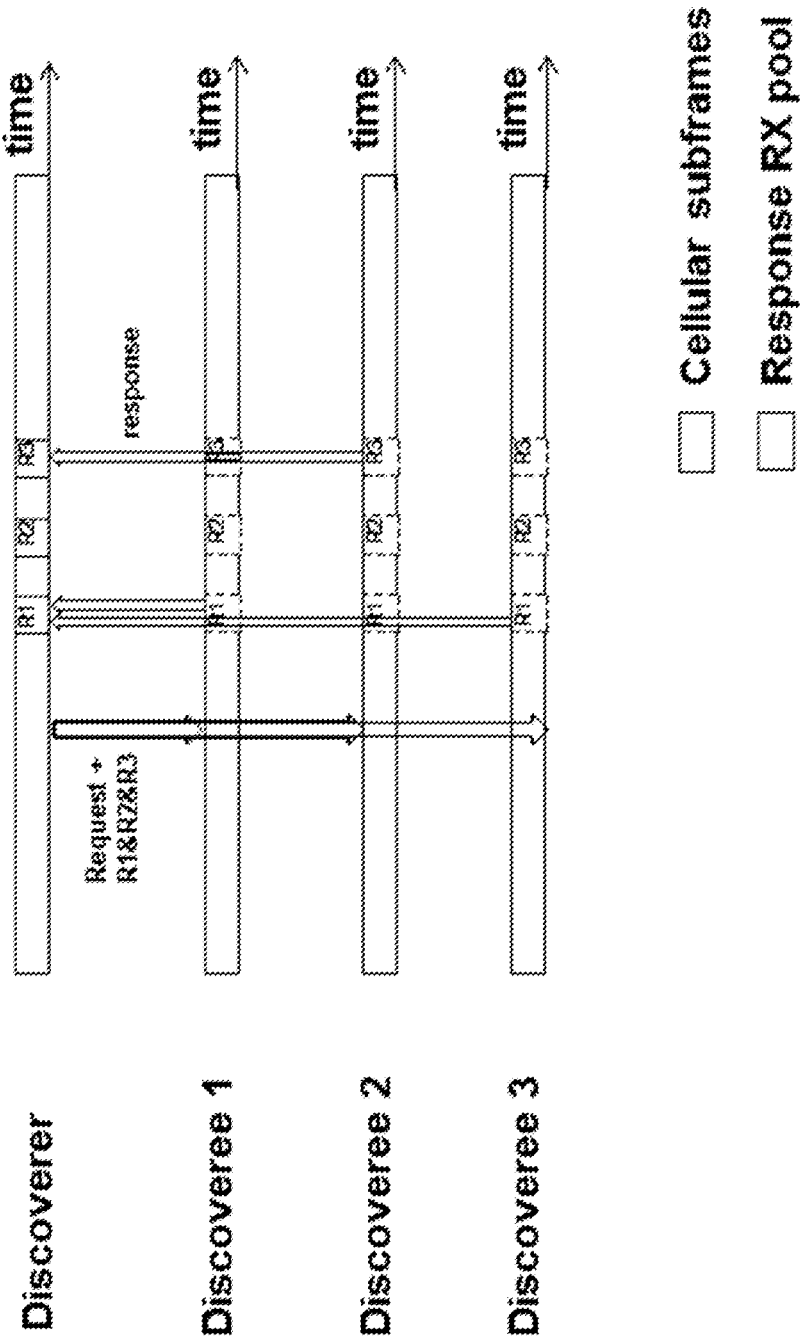
FIG. 3 shows a discovery response RX pool.

As shown in FIG. 3, multiple discovery request messages targeting different discoverees may be sent in the same discovery pool, in the same resources and possibly even in the same discovery message. When discoverees receive a request, they will identify resources for transmitting the discovery response. Such resources may belong to one or more response TX pools. The pools may be different for different users in order to reduce interference issues. In this example, discoveree 1 and discoveree 3 use R1 to transmit response and discoveree uses R3. The discoverer UE only needs to monitor these three resources to receive a response. In some example the discoverer may skip monitoring R2 since no UE is going to use it (provided that the discoverer is aware of such information).

Request RX pool and response RX may be configured by the eNB, when inter-eNB coordination is needed to secure the RX pool covers the corresponding TX pool of its neighboring eNB.

Any one or any combination of the following resource pools may be defined:

| Name | Purpose and definition |
| --- | --- |
| Existing_TX_Pool | Existing (general purpose) discovery pool, including those for UE autonomous resource selection and scheduled resource allocation. May be seen as example of a discovery pool. |
| Request_TX_Pool_eNB | For eNB to grant resource for scheduled resource allocation for discovery request transmission. It is an internal configuration of eNB and may not be known to UE. |

-continued

| Name | Purpose and definition |
|---|---|
| Request_TX_Pool_UE | For UE to select UE autonomous resource selection resource for discovery request transmission. This may be seen as an example of a discovery transmission pool and/or as an example of a discovery request Tx pool. |
| Request_RX_Pool | For discoveree to receive request message Union of {Existing_TX_Pool, Request_TX_Pool_eNB, Request_TX_Pool_UE} of current cell and neighboring cell. This may be seen as an example of a discovery receiving pool and/or as an example of a discovery request RX pool. |
| Response_TX_Pool_eNB | For eNB to grant resource for scheduled resource allocation for discovery response transmission. It is an internal configuration of eNB and may not be known to UE. |
| Response_TX_Pool_UE | For UE to select UE autonomous resource selection resource for discovery response transmission. This may be seen as an example of a discovery transmission pool and/or as an example of a discovery response TX pool. |
| Response_RX_Pool | For discoverer to receive discovery response message Union of {Existing_TX_Pool, Response_TX_Pool_eNB, Response_TX_Pool_UE} of current cell and neighboring cell. This may be seen as an example of a discovery receiving pool and/or a discovery response RX pool. |

Request_TX_Pool_eNB, Request_TX_PooL_UE, Request_RX_Pool, Response_TX_Pool_eNB, Response_TX_PooL_UE and Response_RX_Pool may consist of or comprise frequency resources and/or time resources.

Request_TX_PooL_UE, Request_RX_Pool, Response_TX_PooL_UE and Response_RX_Pool may be configured by an eNB by use of dedicated or broadcast signaling, or they can be part of a UE pre-configuration.

When configured via dedicated signaling, the information may be only configured to those UEs which are interested in model B discovery (provided that the eNB is aware of such information, by e.g. receiving an interest indication from UE).

When the discoverer determines resources of receiving response which will be transmitted to discoveree together with discovery request message:

It may determine by itself if Response_RX_Pool is not configured by eNB;

It may use a subset of Response_RX_Pool provided by eNB

The resources may be contiguous in time domain but the duration of should be small.

The resources may not be contiguous in time domain, i.e. include several time slots, when the accumulation of all time slots should be small.

For IDLE discoverer UE with single receiver, there may be an arrangement such that there is no overlap between the resources and its paging occasions in time domain.

For CONNECTED discoverer UE with single receiver, the resources locate in inactive time of DRX.

Figure 4:
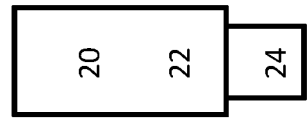
FIG. 4 shows an exemplary user equipment.

FIG. 4 schematically shows a user equipment 10, which may be a node of or for a device-to-device communication, in closer details. User equipment 10 comprises control circuitry 20, which may comprise a controller connected to a memory. A receiving module and/or transmission module and/or control module may be implemented in the control circuitry 20, in particular as module in the controller. The user equipment also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for device-to-device communication, in particular utilizing E-UTRAN/LTE resources as described herein and/or receiving allocation data and/or transmit D2D data based on allocation or configuration data. Any module of the user equipment may be implemented in the circuitries described herein, in particular the control circuitry.

Figure 5:
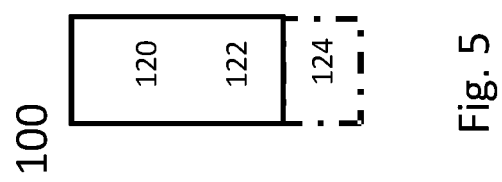
FIG. 5 shows an exemplary network node or base station.

FIG. 5 schematically show a base station or network node 100, which in particular may be an eNodeB. Base station 100 comprises control circuitry 120, which may comprise a controller connected to a memory. A configuring unit and/or a determination unit may be comprised in the control circuitry, the latter in particular if the base station is configured as a coordinating node. The control circuitry is connected to control radio circuitry 122 of the base station 100, which provides receiver and transmitter and/or transceiver functionality. It may be considered that control circuitry 120 comprises an extracting unit as described herein, in particular if the base station is configured to participate as a device in D2D communication. An antenna circuitry 124 may be connected or connectable to radio circuitry 122 to provide good signal reception or transmittance and/or amplification. Any module of the network node or base station may be implemented in the circuitries described herein, in particular the control circuitry.

FIG. 6a shows a method for operating a network node in a wireless communication network. The method comprises an action NS10 of configuring at least one D2D discovery transmitting pool and/or at least one D2D discovery receiving pool.

FIG. 6b shows a network node for a wireless communication network, the network node comprising a configuring module NN10 for performing action NS10.

FIG. 7a shows a method for operating a user equipment, UE, in a wireless communication network. The method comprises an action TS10 of transmitting, by the UE, a D2D discovery request on a resource of a discovery request transmitting pool.

FIG. 7b a shows a user equipment, UE, for a wireless communication network. The UE comprise a transmitting module TN10 for performing action TS10.

FIG. 8a shows a method for operating a user equipment, UE, in a wireless communication network. The method comprises an action RS10 of transmitting a D2D discovery response on a resource of a discovery transmitting pool and/or a discovery response TX pool.

FIG. 8b a shows a user equipment, UE, for a wireless communication network. The UE comprise a transmitting module RN10 for performing action RS10.

With the described approaches, service delay by reducing the delay of resource allocation is provided. Moreover, power consumption for a discoverer UE may be reduced, due to lowering the monitoring requirements, in particular regarding the monitoring of resources for a response.

There is generally disclosed a method for operating a user equipment (UE), which may be a D2D enabled or ProSe-enabled user equipment. The method may comprise using at least one dedicated pool (e.g. a RX and/or TX pool for discovery request and/or response) as outlined above. There is also disclosed a user equipment adapted to carry out any method for operating a user equipment described herein and/or to use at least one dedicated pool (e.g. a RX and/or TX pool for discovery request or response as described herein). The user equipment may generally comprise suitable modules to carry out steps of the method.

Moreover, there is disclosed a method for operating a network node (in particular an eNodeB), which may be a controlling node. The method may comprise configuring at least one dedicated pool (e.g. a RX and/or TX pool for discovery request and/or response) as outlined above. There is also disclosed network node, in particular an eNodeB and/or controlling node, adapted to carry out any method for operating network node or eNodeB described herein and/or to configure at least one dedicated pool (e.g. a RX and/or TX pool for discovery request or response as described herein). The network node may generally comprise suitable modules to carry out steps of the method.

A program product comprising code executable by control circuitry is described, the code causing the control circuitry to perform and/or control any one method disclosed herein, in particular a method for operating a UE or a network node, in particular if running on control circuitry of the UE or the network node.

There is also disclosed a carrier medium arrangement carrying a program product according as described herein and/or code executable by control circuitry, the code causing the control circuitry to perform and/or control any one method disclosed herein. A carrier medium arrangement may comprise at least one carrier medium. The program product may be distributed over more than one carriers, so that e.g. different parts of the program product are stored or carried on different media.

There may generally be considered a wireless device (or UE) adapted for carrying out any of the methods for operating a wireless device described herein. A network node adapted for carrying out any of the methods for operating a network node described herein may be envisaged.

A network node may be implemented as an eNodeB, in particular according to LTE. The network node may be adapted for, and/or comprise a receiving module for, receiving a report from a wireless device, and/or to relay the report to higher layers of the network and/or an operator billing service.

Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

The term UE or user equipment may be used as an example for or interchangeably with wireless device. eNode or base station may be used as an example for or interchangeably with network node.

In this description, for purposes of explanation and not limitation, specific details are set forth (such as particular network functions, processes and signalling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may be between nodes of a wireless communication network and/or in a wireless communication network. It may be envisioned that a node in or for communication, and/or in, of or for a wireless communication network is adapted for, and/or for communication utilizing, one or more RATs, in particular LTE/E-UTRA. A communication may generally involve transmitting and/or receiving messages, in particular in the form of packet data. A message or packet may comprise control and/or configuration data and/or payload data and/or represent and/or comprise a batch of physical layer transmissions. Control and/or configuration data may refer to data pertaining to the process of communication and/or nodes of the communication. It may, e.g., include address data referring to a node of the communication and/or data pertaining to the transmission mode and/or spectral configuration and/or frequency and/or coding and/or timing and/or bandwidth as data pertaining to the process of communication or transmission, e.g. in a header. Each node involved in such communication may comprise radio circuitry and/or control circuitry and/or antenna circuitry, which may be arranged to utilize and/or implement one or more than one radio access technologies. Radio circuitry of a node may generally be adapted for the transmission and/or reception of radio waves, and in particular may comprise a corresponding transmitter and/or receiver and/or transceiver, which may be connected or connectable to antenna circuitry and/or control circuitry. Control circuitry of a node may comprise a controller and/or memory arranged to be accessible for the controller for read and/or write access. The controller may be arranged to control the communication and/or the radio circuitry and/or provide additional services. Circuitry of a node, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WIMAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered. A node of a wireless communication network may be implemented as a Wireless device and/or user equipment and/or base station and/or relay node and/or any device generally adapted for device-to-device communication. A wireless communication network may comprise at least one of a device configured for device-to-device communication, a wireless device, and/or a user equipment and/or base station and/or relay node, in particular at least one user equipment, which may be arranged for device-to-device communication with a second wireless device or node of the wireless communication network, in particular with a second user equipment.

A node of or for a wireless communication network may generally be a wireless device configured for wireless device-to-device communication (D2D), in particular using the frequency spectrum of a cellular and/or wireless communications network, and/or frequency and/or time resources of such a network. Device-to-device communication may optionally include broadcast and/or multicast communication to a plurality of devices or nodes. A cellular network may comprise a network node, in particular a radio network node, which may be connected or connectable to a core network, e.g. a core network with an evolved network core, e.g. according to LTE. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation. Operation and/or communication and/or exchange of signals without involvement of layers above a base station and/or without utilizing a predefined cell structure provided by a base station or eNB, may be considered to be D2D communication or operation, in particular, if it utilises the radio resources, in particular carriers and/or frequencies, and/or equipment (e.g. circuitry like radio circuitry and/or antenna circuitry, in particular transmitter and/or receiver and/or transceiver) provided and/or used for cellular operation.

A wireless device or user equipment (UE) may generally be a device configured for wireless device-to-device communication (it may be a wireless device) and/or a terminal for a wireless and/or cellular network, in particular a mobile terminal, for example a mobile phone, smart phone, tablet, PDA, etc. A user equipment may be a node of or for a wireless communication network as described herein, in particular a wireless device. It may be envisioned that a wireless device user equipment or wireless device is adapted for one or more RATs, in particular LTE/E-UTRA. A user equipment or wireless device may generally be proximity services (ProSe) enabled, which may mean it is D2D capable or enabled. It may be considered that a user equipment or wireless device comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network, in particular a node or device for device-to-device communication, may generally be a user equipment or wireless device. It may be considered that a user equipment is configured to be a user equipment adapted for LTE/E-UTRAN.

A network node may be a base station, which may be any kind of base station of a wireless and/or cellular network adapted to serve one or more wireless device or user equipments. It may be considered that a base station is a node of a wireless communication network. A base station may be adapted to provide and/or define one or more cells of the network and/or to allocate or schedule frequency and/or time resources for communication to one or more nodes of a network, in particular UL resources, for example for device-to-device communication, which may be communication between devices different from the base station. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in device-to-device communication, e.g. as a device directly involved or as an auxiliary and/or coordinating node. Generally, a base station may be arranged to communicate with a core network and/or to provide services and/or control to one or more user equipments and/or to relay and/or transport communications and/or data between one or more user equipments and a core network and/or another base station and/or be Proximity Service enabled. An eNodeB (eNB) may be envisioned as an example of a base station, in particular according to LTE. A base station may generally be proximity service enabled and/or to provide corresponding services. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a controlling node and/or to allocate resources in particular for device-to-device communication between two nodes of a wireless communication network, in particular two user equipments.

Device-to-device (D2D) communication or operation may generally refer to communication between nodes or wireless devices of or for a wireless communication network or corresponding operation of one or more nodes, which may utilize the frequency spectrum and/or frequency and/or time resources of the network, in particular according to LTE/E-UTRAN. The communication may be wireless communication. A device in this context may be a node of the wireless communication network, in particular a user equipment or a base station. Device-to-device communication may in particular be communication involving at least one user equipment, e.g. between two or more user equipments. Device-to-device communication may be relayed and/or provided via a base station or coordinating node or relay node, in particular without interaction with a core network and/or layers of the network above a base station or coordinating node, or be direct communication between two devices, e.g. user equipments, without involvement of a base station or controlling node and/or with a base station or controlling node providing merely auxiliary services, e.g. configuration data or a transmission configuration or related information for a message intended for device-to-device communication between user equipments. D2D communication may be communication between two wireless devices in a region without cellular coverage and/or without interaction with a cellular or mobile network. In the latter case, it may be considered that data and/or signals flowing between the nodes performing device-to-device communication are not transported via a base station and/or controlling node. In contrast, during cellular communication, network layers above the eNB/base station/coordination node may generally be involved, in particular core layers which may be connected to the eNB/base station/coordinating node via cable/land line. During device-to-device communication, a message may be provided and/or transmitted and/or received. A device configured for and/or capable of device-to-device communication, which may be called wireless device or D2D enabled node, may comprise control circuitry and/or radio circuitry configured to provide device-to-device communication, in particular configured to enable proximity services (ProSe-enabled), e.g., according to LTE/E-UTRA requirements. D2D operation or communication and cellular operation or communication may be considered different operation types or modes, which may generally performed using resources from the same pool of available resources, e.g. allocated resources and/or the same carriers.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

Resources or communication resources or radio resources may generally be frequency and/or time resources (which may be called time/frequency resources). Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Allocated resources may in particular refer to UL resources, e.g. UL resources for a first wireless device to transmit to and/or for a second wireless device. Transmitting on allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated. A network or a node of a network, e.g. an allocation node, may be adapted to determine and/or transmit corresponding allocation data indicating release or de-allocation of resources to one or more wireless devices, in particular to a first wireless device. Accordingly, D2D resource allocation may be performed by the network and/or by a node, in particular a node within and/or within a cell of a cellular network covering the wireless devices participating or intending to participate in the D2D communication.

Allocation data may be considered to be data indicating and/or granting resources allocated by the controlling or allocation node, in particular data identifying or indicating which resources are reserved or allocated for D2D communication for a wireless device and/or which resources a wireless device may use for D2D communication and/or data indicating a resource grant or release. A grant or resource grant may be considered to be one example of allocation data. It may be considered that an allocation node is adapted to transmit allocation data directly to a node and/or indirectly, e.g. via a relay node and/or another node or base station. Allocation data may comprise control data and/or be part of or form a message, in particular according to a pre-defined format, for example a DCI format, which may be defined in a standard, e.g. LTE.

In the context of this description, a user equipment or wireless device generally may be a device capable of D2D communication and/or operation, in particular using frequencies and/or resources of a cellular and/or licensed communication system, e.g. a system according to a LTE standard, and may be also referred to as D2D enabled or capable UE or node. A wireless device may comprise any entity or equipment or device or node capable of at least receiving and/or transmitting radio signals on a direct radio link, i.e., between the entity and another D2D capable entity or wireless device. A wireless device or wireless device may for example be comprised in or comprise a cellular UE, PDA, a wireless device, laptop, mobile, sensor, relay, D2D relay, a small base station employing a UE-like interface, etc. Any device or entity capable to support and/or perform at least one D2D operation may be considered a wireless device; a wireless device may be adapted to support and/or perform at least one D2D operation. A wireless device may generally be adapted for cellular operation and/or communication in a wireless communication network. It may be considered that a wireless device generally comprises radio circuitry and/or control circuitry for wireless communication, in particular D2D operation or communication and cellular operation or communication. A wireless device may comprise a software/program arrangement arranged to be executable by a hardware device, e.g. control circuitry, and/or storable in a memory of e.g. a UE or terminal, which may provide D2D functionality and/or corresponding control functionality to e.g. a UE or terminal.

D2D operation may comprise any action or activity related to D2D or D2D communication and may be used interchangeably with D2D communication. D2D operation may include, e.g., transmitting or receiving a signal/channel type or data for D2D purposes and/or in D2D operation, transmitting or receiving data by means of D2D communication, transmitting or receiving control or assistance data for D2D purpose, transmitting or receiving a request for control or assistance data for D2D, selecting a D2D operation mode, initiating/starting D2D operation, switching to D2D operation mode from a cellular operation mode, configuring receiver or transmitter with one or more parameters for D2D.

ProSe or D2D operation may be for a commercial purpose or to support public safety, using the data related to D2D. D2D operation may or may not be specific to a certain D2D service. A D2D receive operation may be, and/or be comprised in, a D2D operation, which may, in one example, also involve other than D2D receive operations. A D2D operation may generally be performed or performable by a wireless device or UE. A D2D receive operation may comprise receiving, by a wireless device or UE, of D2D data and/or signals. A D2D transmit operation may comprise, transmitting, by a wireless device or UE, of D2D data and/or signals. A wireless device performing at least one ProSE/D2D operation may be considered to be in D2D or D2D mode or in D2D operation. D2D operation may comprise D2D measurements. A user equipment adapted to perform at least one type of ProSe/D2D operation may be considered to be ProSe/D2D-enabled.

A D2D measurement may be a measurement, e.g. performed by a wireless device, performed for D2D purpose and/or on D2D signals/channels and/or regarding D2D operation and/or communication. D2D measurement may comprise any one or any combination of: D2D RRM measurement, D2D positioning measurement, D2D synchronization measurement, measurement on D2D synchronization signals, measurement on D2D reference signals, measurement on D2D channel/s, signal-to-noise measurement, signal strength measurement, signal quality measurement, in particular measurement of received signal strength, of received signal quality, RLM, synchronization, one-directional and/or two-directional timing measurement, RTT or Rx-Tx or similar measurement, measurement of number of successful and/or unsuccessful channel decodings or receptions, data throughput measurements, measurement of amount of data transmitted and/or received, billing-relevant measurement; these measurement may be performed regarding D2D communication and/or D2D operation.

Cellular operation (in particular by a wireless device or UE) may comprise any action or activity related to a cellular network (any one or more RATs). Some examples of cellular operation may be a radio signal transmission, a radio signal reception, performing a radio measurement, performing a mobility operation or RRM related to a cellular network.

D2D transmission or communication may be any transmission or communication by a wireless device or device and/or in a D2D operation or mode or communication. Some examples of D2D transmission may comprise physical signals or physical channels, dedicated or common/shared, e.g., reference signal, synchronization signal, discovery channel, control channel, data channel, broadcast channel, paging channel, scheduling assignment (SA) transmissions, etc. A D2D transmission on a direct radio link may be intended for receiving by another wireless device. A D2D transmission may be a unicast, groupcast, or broadcast transmission. A D2D transmission may be on the uplink time-frequency resources of a wireless communication system.

A network node may be a controlling node connected or connectable to a UE for cellular and/or D2D communication. A controlling node may be defined by its functionality of configuring the UE device, in particular in regards to measuring and/or reporting data pertaining to D2D operation, and/or for defining and/or allocating and/or configuring one or more than one resource pools, in particular resource pools for ProSe operation and/or ProSe discovery. A controlling node may be a network node that is adapted to schedule, decide and/or select and/or allocate, at least in part, time-frequency resources to be used for at least one of: cellular communication or transmissions and D2D communication or transmissions. The controlling node may also provide scheduling information to another node, such as another wireless device, a cluster head, a radio network node such as eNodeB, or a network node (e.g. a core network node), MME, positioning node, D2D server, RNC, SON, etc). The network node or controlling node may be or communicate with a radio network node. It may be envisioned that a controlling node may also perform coordination and/or control for one or more wireless device or UEs. The coordination and/or control may be performed in a centralized or distributed manner. A controlling node may be referred to as an allocating node and/or a coordinating node.

A network device or node and/or a wireless device may be or comprise a software/program arrangement arranged to be executable by a hardware device, e.g. control circuitry, and/or storable in a memory, which may provide D2D functionality and/or corresponding control functionality.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT.

RAT (radio access technology) may generally include: e.g. LTE FDD, LTE TDD, GSM, CDMA, WCDMA, WiFi, WLAN, WiMAX, etc.

A network node may generally be a radio network node (which may be adapted for wireless or radio communication, e.g. with a wireless device or a UE) or another network node, e.g. an eNodeB. A network node generally may be a controlling or allocating node; an eNodeB defining and/or configuring one or more resource pools may be seen as controlling or allocating node. Some examples of a radio network node or controlling node are a radio base station, in particular an eNodeB, a relay node, an access point, a cluster head, RNC, etc. The radio network node may be comprised in a mobile communication network and may support and/or be adapted for cellular operation or communication and/or D2D operation or communication.

A network node, in particular a radio network node, may comprise radio circuitry and/or control circuitry, in particular for wireless communication. Some examples of a network node, which is not a radio network node, may comprise: a core network node, MME, a node controlling at least in part mobility of a wireless device, SON node, O&M node, positioning node, a server, an application server, a D2D server (which may be capable of some but not all D2D-related features), a node comprising a ProSe function, a ProSe server, an external node, or a node comprised in another network. Any network node may comprise control circuitry and/or a memory.

A network node may be considered to be serving a wireless device or UE, if it provides a cell of a cellular network to the served node or wireless device or UE and/or is connected or connectable to the wireless device or UE via and/or for transmission and/or reception and/or UL and/or DL data exchange or transmission and/or if the network node is adapted to provide the wireless device or UE with allocation and/or configuration data and/or a measurement performance characteristic and/or to configure the wireless device or UE.

A wireless device may generally be a node or device adapted to perform D2D communication, in particular transmission and/or reception, and/or at least one type of D2D operations. In particular, a wireless device may be a terminal and/or user equipment and/or D2D enabled machine and/or sensor. The wireless device may be adapted to transmit and/or receive D2D data based on allocation data, in particular on and/or utilizing resources indicate in the allocation data. D2D communication and/or transmission by a wireless device may generally be in UL resources and/or corresponding carrier or frequency and/or modulation. A wireless device (such as a UE) may be adapted for and/or capable of carrier aggregation (CA) or CA operation. In particular, it may be adapted to transmit and/or receive one or more than one CCs and/or utilising, and/or participating in, carrier aggregation.

A wireless device may be adapted to configure itself and/or be configured according to configuration data, which may include setting up and/or scheduling resources and/or equipment for receiving and/or transmitting and/or sharing of resources and/or in particular D2D operation and/or cellular operation based on the configuration data. Configuration data may be received, by the wireless device, from another node or wireless device, in particular a network node.

A network node may generally be adapted to provide and/or determine and/or transmit configuration data, in particular to a wireless device. Configuration data may be considered to be a form of allocation data and/or may be provided in the form of a message and/or data packet/s. Configuring a wireless device or UE, e.g. configuring of the node by a network node, may include determining and/or transmitting configuration data to the node to be configured, i.e. the wireless device or UE. Determining the configuration data and transmitting this data to a wireless device or UE may be performed by different nodes, which may be arranged such that they may communicate and/or transport the configuration data between each other, in particular such that the node determining or adapted to determine the configuration data may transmit the configuration data to the node transmitting it or adapted to transmit it; the latter node may be adapted to receive the configuration data and/or relay and/or provide a message bases on the configuration data, e.g. by reformatting and/or amending and/or updating data received.

Cellular DL operation and/or communication of a wireless device or UE may refer to receiving transmissions in DL, in particular in cellular operation and/or from a network node/eNB/base station. Cellular UL operation of a wireless device or UE may refer to UL transmissions, in particular in cellular operation, e.g. transmitting to a network or network node/eNB/base station.

Configuring a, or by a, wireless device may comprise setting one or more parameters and/or registers of the wireless device and/or tune and/or set one or more components or subsystems and/or circuitry, e.g. a control circuitry and/or radio circuitry, in particular to bring the wireless device into a desired operation mode, e.g. for transmitting and/or receiving data according to allocated resources and/or as scheduled by a network node and/or to be configured for communication via or with one or more cells of a cellular network and/or one or more than one ProSe enabled devices. A wireless device may be adapted for configuring itself, e.g. based on configuration and/or allocation data, which it may receive from a network or network node.

Configuring a resource pool may generally comprise determining and/or scheduling and/or allocating and/or assigning resources to the pool, e.g. based on pre-determined information and/or based on operating conditions (e.g., whether or not there are UEs/wireless devices that indicate D2D capability and/or interest in D2D communication, and/or how many there are, and/or whether their number changes, and/or one or more D2D-related indications from one or more user equipments). Configuring may comprise indicating the resource pool, for example to one or more UEs.

The notation response (message) or request (message) is short-hand for response and/or response message and request and/or request message, respectively; analogue notations may be used. A (discovery or D2D discovery) request may generally comprise information indicating that the UE sending the request is interested in and/or capable of D2D communication and/or which D2D communication mode it prefers/is capable of, and/or information regarding the UE sending the request (e.g. regarding its identity, for example an identifier provided by a network node and/or within a cell, like a RNTI (Radio Network Temporary Identifier) and/or IP-address and/or fixed or configurable other identifier/s like a MAC address or SIM-card based identity, and/or regarding its own capability or capabilities, for example pertaining to D2D communication, and/or regarding preferred communication modes, like frequency or resource-related information and/or which resources to be preferred, etc.).

A (discovery/D2D discovery) response may generally comprise information indicating whether the UE sending the response is interested in and/or capable of D2D communication (for example, with a UE from which it received a request) or not (in particular, if it is capable of/interested in or not of D2D communication as indicated in a request), and/or information regarding the UE sending the request (e.g. regarding its identity, for example an identifier provided by a network node and/or within a cell, like a RNTI (Radio Network Temporary Identifier) and/or IP-address and/or fixed or configurable other identifier/s like a MAC address or SIM-card based identity, and/or regarding its own capability or capabilities, for example pertaining to D2D communication, and/or regarding preferred communication modes, like frequency or resource-related information and/or which resources to be preferred, etc.).

Each or any one of the wireless devices or user equipments described or shown may be adapted to perform the methods to be carried out by a user equipment or wireless device described herein. Alternatively or additionally, each or any of the wireless devices or user equipments shown in the figures may comprise any one or any combination of the features of a user equipment or wireless device described herein. Each or any one of the network nodes or controlling nodes or eNBs or base stations described or shown in the figures may be adapted to perform the methods to be carried out by network node or base station described herein. Alternatively or additionally, the each or any one of the controlling or network nodes or eNBs or base stations shown in the figures may comprise any one or any one combination of the features of a network node or eNB or base station described herein.

Some abbreviations used are:
3GPP 3$^{rd}$ Generation Partnership Project
Ack/Nack Acknowledgment/Non-Acknowledgement, also A/N
AP Access point
BER/BLER Bit Error Rate, BLock Error Rate;
BS Base Station
CA Carrier Aggregation
CoMP Coordinated Multiple Point Transmission and Reception
CQI Channel Quality Information
CRS Cell-specific Reference Signal
CSI Channel State Information
CSI-RS CSI reference signal
D2D Device-to-device
DL Downlink
EPDCCH Enhanced Physical DL Control CHannel
DL Downlink; generally referring to transmission of data to a node/into a direction further away from network core (physically and/or logically); in particular from a base station or eNodeB to a wireless device or UE; often uses specified spectrum/bandwidth different from UL (e.g. LTE)
eNB evolved NodeB; a form of base station, also called eNodeB
E-UTRA/N Evolved UMTS Terrestrial Radio Access/Network, an example of a RAT
f1, f2, f3, . . . , fn carriers/carrier frequencies; different numbers may indicate that the referenced carriers/frequencies are different
f1_UL, . . . , fn_UL Carrier for Uplink/in Uplink frequency or band
f1_DL, . . . , fn_DL Carrier for Downlink/in Downlink frequency or band
FDD Frequency Division Duplexing
ID Identity
IMSI International Mobile Subscriber Identity
L1 Layer 1
L2 Layer 2
LTE Long Term Evolution, a telecommunications or wireless or mobile communication standard
MAC Medium Access Control
MBSFN Multiple Broadcast Single Frequency Network
MDT Minimisation of Drive Test
MPC Measurement Performance Characteristic
NW Network
OFDM Orthogonal Frequency Division Multiplexing
O&M Operational and Maintenance
OSS Operational Support Systems
PC Power Control
PDCCH Physical DL Control CHannel
PH Power Headroom
PHR Power Headroom Report
PLMN Public Land Mobile Network
ProSe Proximity Service/s, another name for D2D
PSS Primary Synchronization Signal
PUSCH Physical Uplink Shared CHannel
RA Random Access
RACH Random Access CHannel
RAT Radio Access Technology
RE Resource Element
RB Resource Block
RRH Remote radio head
RRM Radio Resource Management
RRU Remote radio unit
RSRQ Reference signal received quality
RSRP Reference signal received power
RSSI Received signal strength indicator
RX reception/receiver, reception-related
SA Scheduling Assignment
SIB System Information Block
SINR/SNR Signal-to-Noise-and-Interference Ratio; Signal-to-Noise Ratio
SFN Single Frequency Network
SON Self Organizing Network
SSS Secondary Synchronization Signal
TPC Transmit Power Control
TX transmission/transmitter, transmission-related
TDD Time Division Duplexing
UE User Equipment
UICC Universal Integrated Circuit Card; card used for mobile/cellular communication in a UE
UL Uplink; generally referring to transmission of data to a node/into a direction closer to a network core (physically and/or logically); in particular from a wireless device or UE to a base station or eNodeB; in the context of D2D, it may refer to the spectrum/bandwidth utilized for transmitting in D2D, which may be the same used for UL communication to a eNB in cellular communication; in some D2D variants, transmission by all devices involved in D2D communication may in some variants generally be in UL spectrum/bandwidth/carrier/frequency These and other abbreviations may be used according to LTE standard definitions if applicable.

The invention claimed is:

1. A method for operating a network node in a wireless communication network, the method comprising:
configuring at least one device-to-device (D2D) discovery transmitting pool and at least one corresponding D2D discovery receiving pool; and
transmitting an indication of the at least one D2D discovery transmitting pool and an indication of the at least one corresponding D2D discovery receiving pool to a wireless device, wherein the indication of the at least one corresponding D2D discovery receiving pool is transmitted to the wireless device after the wireless device transmits a D2D discovery request on a resource of the at least one D2D discovery transmitting pool, wherein the D2D discovery request comprises information that indicate resources on which a corresponding discovery response is to be received,
wherein the at least one corresponding D2D discovery receiving pool comprises one or more resources allocated to the at least one D2D discovery transmitting pool so that the wireless device is informed of when to expect transmission.

2. A network node for a wireless communication network, the network node comprising:
a memory; and
control circuitry coupled to the memory, the control circuitry operable to:
configure at least one device-to-device (D2D) discovery transmitting pool and at least one corresponding D2D discovery receiving pool; and
transmit an indication of the at least one D2D discovery transmitting pool and an indication of the at least one corresponding D2D discovery receiving pool to a wireless device, wherein the indication of the at least one corresponding D2D discovery receiving pool is transmitted to the wireless device after the wireless device transmits a D2D discovery request on a resource of the at least one D2D discovery transmitting pool, wherein the D2D discovery request comprises information that indicate resources on which a corresponding discovery response is to be received,
wherein the at least one corresponding D2D discovery receiving pool comprises one or more resources allocated to the at least one D2D discovery transmitting pool so that the wireless device is informed of when to expect transmission.

3. A method for operating a user equipment (UE) in a wireless communication network, the method comprising:
receiving, from a network node, an indication of at least one device-to-device (D2D) discovery request transmitting pool and an indication of at least one corresponding D2D discovery response receiving pool, wherein the at least one corresponding D2D discovery response receiving pool comprises one or more resources allocated to the at least one D2D discovery request transmitting pool so that the UE is informed of when to expect transmission;
comparing a time, when a resource of the at least one D2D discovery request transmitting pool is to be transmitted, with an estimated time when a scheduled resource is to be received from the network node;
transmitting, by the UE, a D2D discovery request on the resource of the at least one D2D discovery request transmitting pool in response to the time, when the resource of the at least one D2D discovery request transmitting pool is to be transmitted, being smaller than the estimated time when the scheduled resource is to be received from the network node; and
monitoring the one or more resources of the at least one corresponding D2D discovery response receiving pool that are allocated to the at least one D2D discovery request transmitting pool.

4. The method of claim 3, wherein the indication of the at least one corresponding D2D discovery response receiving pool is received after the D2D discovery request is transmitted on the resource of the at least one D2D discovery request transmitting pool.

5. A user equipment (UE) for a wireless communication network, the UE comprising:
a memory; and
control circuitry coupled to the memory, the control circuitry operable to:
receive, from a network node, an indication of at least one D2D discovery request transmitting pool and an indication of at least one corresponding D2D discovery response receiving pool, wherein the at least one corresponding D2D discovery response receiving pool comprises one or more resources allocated to the at least one D2D discovery request transmitting pool so that the UE is informed of when to expect transmission;
compare a time, when a resource of the at least one D2D discovery request transmitting pool is to be transmitted, with an estimated time when a scheduled resource is to be received from the network node;
transmit a D2D discovery request on a resource of the at least one D2D discovery request transmitting pool in response to the time, when the resource of the at least one D2D discovery request transmitting pool is to be transmitted, being smaller than the estimated time when the scheduled resource is to be received from the network node; and
monitor the one or more resources of the at least one corresponding D2D discovery response receiving pool that are allocated to the at least one D2D discovery request transmitting pool.

6. The UE of claim 5, wherein the indication of the at least one corresponding D2D discovery response receiving pool is received after the D2D discovery request is transmitted on the resource of the at least one D2D discovery request transmitting pool.

7. A method for operating a user equipment (UE) in a wireless communication network, the method comprising:
receiving, from a network node, an indication of a discovery transmitting pool and a discovery response transmitting (TX) pool;
comparing a time, when a resource from the discovery transmitting pool is to be transmitted, to a time when a resource from the discovery response TX pool is to be transmitted; and
based on the comparison, transmitting a device-to-device (D2D) discovery response on one of the resource of the discovery transmitting pool and the resource of the discovery response TX pool, wherein the resource, on which the D2D discovery response is transmitted, is one of the resource of the discovery transmitting pool and the resource of the discovery response TX pool, that is earlier available for transmitting.

8. The method of claim 7, further comprising:
receiving, from the network node, an indication of a discovery receiving pool and a discovery request receiving (RX) pool; and
monitoring at least one resource of the discovery receiving pool and the discovery request RX pool for a D2D discovery request.

9. A user equipment (UE) for a wireless communication network, the UE comprising:
a memory; and
control circuitry coupled to the memory, the control circuitry operable to:
receive, from a network node, an indication of a discovery transmitting pool and a discovery response transmitting (TX) pool;
compare a time, when a resource from the discovery transmitting pool is to be transmitted, to a time when a resource from the discovery response TX pool is to be transmitted; and
based on the comparison, transmit a device-to-device (D2D) discovery response on one of the resource of the discovery transmitting pool and the resource of the discovery response TX pool, wherein the resource, on which the D2D discovery response is transmitted, is one of the resource of the discovery transmitting pool and the resource of the discovery response TX pool, that is earlier available for transmitting.

10. The UE of claim 9, wherein the control circuitry is further operable to:
receive, from the network node, an indication of a discovery receiving pool and a discovery request receiving (RX) pool; and
monitor at least one resource of the discovery receiving pool and the discovery request RX pool for a D2D discovery request.

11. A non-transitory computer-readable storage medium comprising code executable by control circuitry, the code causing the control circuitry to:
configure at least one device-to-device (D2D) discovery transmitting pool and at least one corresponding D2D discovery receiving pool; and
transmit an indication of the at least one D2D discovery transmitting pool and the at least one corresponding D2D discovery receiving pool to a wireless device, wherein the indication of the at least one corresponding D2D discovery receiving pool is transmitted to the wireless device after the wireless device transmits a D2D discovery request on a resource of the at least one D2D discovery transmitting pool, wherein the D2D discovery request comprises information which indicate resources on which a corresponding discovery response is to be transmitted,
wherein the at least one corresponding D2D discovery receiving pool comprises one or more resources allocated to the at least one D2D discovery transmitting pool so that the wireless device is informed of when to expect transmission.

12. A non-transitory computer-readable storage medium comprising code executable by control circuitry, the code causing the control circuitry to:
receive, from a network node, an indication of at least one device-to-device (D2D) discovery request transmitting pool and an indication of at least one corresponding D2D discovery response receiving pool, wherein the at least one corresponding D2D discovery response receiving pool comprises one or more resources allocated to the at least one D2D discovery request transmitting pool so that a user equipment (UE) is informed of when to expect transmission;
compare a time, when a resource of the at least one D2D discovery request transmitting pool is to be transmitted, with an estimated time when a scheduled resource is to be received from the network node;
transmit, by the UE, a D2D discovery request on a resource of the at least one D2D discovery request transmitting pool in response to the time, when the resource of the at least one D2D discovery request transmitting pool is to be transmitted, being smaller than the estimated time when the scheduled resource is to be received from the network node; and
monitor the one or more resources of the at least one corresponding D2D discovery response receiving pool that are allocated to the at least one D2D discovery request transmitting pool.

13. The non-transitory computer-readable storage medium of claim 12, wherein the indication of the at least one corresponding D2D discovery response receiving pool is received after the D2D discovery request is transmitted on the resource of the at least one D2D discovery request transmitting pool.

14. A non-transitory computer-readable storage medium comprising code executable by control circuitry, the code causing the control circuitry to:
receive, from a network node, an indication of a discovery transmitting pool and a discovery response transmitting (TX) pool;
compare a time, when a resource from the discovery transmitting pool is to be transmitted, to a time when a resource from the discovery response TX pool is to be transmitted; and
based on the comparison, transmit a device-to-device (D2D) discovery response on one of the resource of the discovery transmitting pool and the resource of the discovery response TX pool, wherein the resource, on which the D2D discovery response is transmitted, is one of the resource of the discovery transmitting pool and the resource of the discovery response TX pool, that is earlier available for transmitting.

15. The non-transitory computer-readable storage medium of claim 14, wherein the code further causes the control circuitry to:
receive, from the network node, an indication of a discovery receiving pool and a discovery request receiving (RX) pool; and
monitor at least one resource of the discovery receiving pool and the discovery request RX pool for a D2D discovery request.

* * * * *